United States Patent

[11] 3,587,617

| [72] | Inventor | Zenny Olsen<br>Nashua, N.H. |
|---|---|---|
| [21] | Appl. No. | 797,303 |
| [22] | Filed | Dec. 16, 1968 |
| [45] | Patented | June 28, 1971 |
| [73] | Assignee | Allied Control Company, Incorporated<br>Plantsville, Conn. |

[54] FLUID CONTROL APPARATUS
6 Claims, 5 Drawing Figs.

| [52] | U.S. Cl. | 137/85, 137/625.64 |
|---|---|---|
| [51] | Int. Cl. | F15b 5/00, G05d 16/00 |
| [50] | Field of Search | 137/85, 625.64, 84 |

[56] References Cited
UNITED STATES PATENTS

| 2,931,389 | 4/1960 | Moog | 137/85X |
|---|---|---|---|
| 3,211,063 | 10/1965 | Seamone | 137/85X |
| 3,245,424 | 4/1966 | Olsen | 137/625.64X |
| 3,433,249 | 3/1969 | Nelson | 137/85X |

*Primary Examiner*—Alan Cohan
*Attorney*—Kenneth B. Hamlin

ABSTRACT: The present invention pertains to a pressure regulated hydraulic servo valve having a spool piston with three lands and communicating with a variable pressure chamber at one end of the spool and with a compensation chamber at the other end thereof. The inner land controls the application of system pressure to either one of a pair of control ports. The outer lands controls the application of system return to either of the control ports. One of the control ports is coupled through a fixed orifice to the compensation chamber and the other of the control ports is coupled through a fixed orifice to the variable pressure chamber. Both the compensation and variable chambers are coupled through a fixed orifice to system return. A torsionally mounted cantilever flapper variably occludes an output nozzle or variable orifice communicating with system pressure in dependence upon the input signal to the valve. The variable pressure chamber communicates with system pressure through the variable orifice. In one embodiment, the flapper is connected to a shaft which is in turn coupled to a spring and an input pin. The pressure in the variable pressure chamber is varied by mechanical displacement of the input pin which varies the force exerted by the spring upon the flapper. In another embodiment, the flapper is torsionally coupled to the armature of an electromagnetic motor. The pressure in the variable pressure chamber is varied by electrical displacement of the armature which varies the position of the flapper. The spool piston is displaced in a manner so as to vary the pressure in the compensation and variable pressure chambers so as to balance the same with respect to each other after the desired output pressure and spool displacement has been obtained.

+ ← SPOOL DISPLACEMENT → −

ZENNY OLSEN
INVENTOR.

BY

David A. Rich
ATTORNEY.

FLUID CONTROL APPARATUS

The present invention pertains to pressure regulated hydraulic fluid servo valves and more particularly to valves of the aforedescribed-type for providing a controlled pressure for operation of an output actuation device and which employs either an electrical or a mechanical input actuation.

Prior art servo valves of the aforedescribed type usually require push-pull action in a pilot stage to provide pressure control by means of displacement of a second stage or controlled piston stage in accordance with an input signal supplied to the valve. These types of valves exhibit severe difficulty of construction as concerns concentricity of parts within close tolerances, such as one or two microns. Moreover, displacement in the pilot stage is normally in the order of one or two thousandths of an inch, whereby it is exceedingly difficult to provide a controlled pressure over a substantial portion of the system pressure range when the valve is operated by means of a mechanical input displacement signal.

Furthermore, prior art valves, as discussed hereinabove, are intricate, complex and uneconomical from the standpoint of manufacture.

Accordingly, it is an object of the present invention to provide a new and improved fluid control apparatus which is capable of actuating an output device at a desired pressure level.

Another object of the present invention is to provide an improved fluid control apparatus which is responsive to either an electrical or a mechanical input actuation.

A further object of the present invention is to provide an improved hydraulic servo valve whose responses to an input signal provides an output signal in accordance with the desired pressure condition.

It is still another object of the present invention to provide an improved hydraulic servo valve which compensates for variations in system pressure.

It is yet another object of the present present invention to provide an improved hydraulic servo valve which can be fabricated economically and which is reliable in operation.

There are other objects, features and advantages of the present invention which will become more apparent from the following detailed description considered in conjunction with the accompanying drawings, wherein.

In accordance with the present invention there is provided a fluid control apparatus including a housing having a variable pressure chamber formed therein. The chamber is in flow communication with a pressurized source of fluid. The chamber includes means for varying the pressure in the chamber in accordance with a predetermined signal. The housing also includes a compensation pressure chamber therein which is coupled to the variable pressure chamber via pressure responsive means which controls the application of pressurized fluid to the compensation pressure chamber for varying the pressure in the variable chamber. Output means are provided for coupling fluid pressure indicative of compensation pressure to an output actuation device.

In one form of the invention the pressure varying means has a displaceable pilot valve member coupled to a mechanical displacement transformer means to which a displaceable pilot signal element is coupled so as to enable a relatively large displacement of the pilot element to produce a relatively small displacement of the pilot valve member.

In a preferred embodiment of the invention the pilot valve member is a cantilever torsionally coupled to the valve housing and the pressure in the compensating chamber varies linearly with respect to the pressure in the variable chamber throughout substantially the entire pressure range. The pressure responsive means comprises a cylindrical piston having three spaced lands disposed in coaxial alignment. The transformer means includes a resilient element such as a compression spring. The variable pressure chamber has an input nozzle in flow communication with the system pressure and an output fixed orifice communicating with system return. The pressure in the variable chamber is varied by displacement of the pilot valve member which then variably occludes the nozzle. The input signal element, the transformer, the pilot valve stage and the control valve stage, including the cylindrical spool piston, and the compensation chamber are preferably in coaxial linear alignment.

Figure 1:
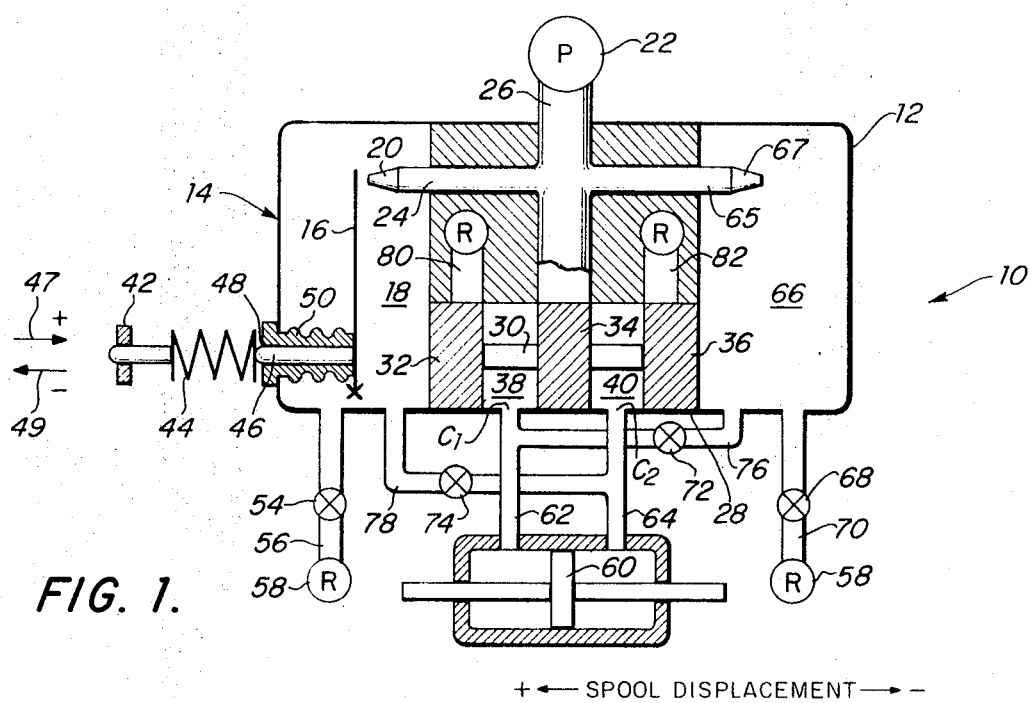
FIG. 1 is a sectional view of a two stage hydraulic servo valve constructed in accordance with one embodiment of the present invention.

Referring now to the drawings, and more particularly to FIG. 1 thereof, there is shown a two stage hydraulic servo valve having an in-line mechanically displaced flapper control pilot valve operating on a second stage moveable spool-type piston valve, constructed in accordance with the present invention and indicated generally by the reference numeral 10. The valve 10 includes a housing 12 within which is disposed the pilot valve 14. The pilot valve 14 includes a pilot valve flapper member 16 disposed in a variable pressure chamber 18. The pilot valve flapper member 16 is positioned adjacent the nozzle 20 which is in fluid flow communication with system pressure 22 by means of conduits 24 and 26. The nozzle 20 is a variable orifice whose variation is dependent upon the degree of occlusion thereof by the flapper 16.

The second stage of the valve 10 includes a piston cylinder 28 which contains the piston spool 30. The spool 30 includes coaxially aligned lands 32, 34 and 36 which define control chambers 38 and 40.

The valve also includes an input force and displacement pin 42 which is in axial alignment with and connected to a resilient mechanical displacement-force transformer such as the spring 44.

The spring 44 is coupled to an input pilot mechanical displacement piston element 46 which extends through an opening 48 in the housing 12. The pilot signal piston element 46 is disposed along an axis for motion which is either positive or negative (as indicated by the opposing arrows 47 and 49) with respect to the null position of the valve. The piston element 46 is coupled to the torsionally mounted, cantilever pilot valve flapper member 16 disposed within the variable pressure chamber 18 by means of a coaxially oriented bellows 50.

The land 32 of the piston spool 30 is exposed to the variable pressure chamber 18 and the motion of the spool 30 is determined by the pressure in the chamber 18. The chamber 18 is connected through the fixed restrictor 54 via conduit 56 to the system return 58.

A pair of control ports designated $C_1$ and $C_2$ formed in the valve housing communicate with the control chambers 38 and 40, respectively. The ports $C_1$ and $C_2$ are coupled to an output actuation device such as a piston load 60, by means of conduits 62 and 64, respectively.

A compensation chamber 66 is formed in the valve housing 12 and communicates with the end of the spool piston adjacent land 36 remote from the end which is in communication with the variable chamber 18.

The compensation chamber 66 is supplied with pressurized fluid by means of a conduit 65 connected to pressure conduit 26, and a nozzle 67 which serves as a fixed restrictor. The compensation chamber is also coupled through the fixed restrictor 68 via conduit 70 to system return 58.

The control ports $C_1$ and $C_2$ also provide pressure feedback to the chambers 66 and 18, respectively, through fixed restrictors 72 and 74 via conduits 76 and 78, connected to conduits 62 and 64, respectively.

OPERATION

When the valve 10 is in the reference or null position shown in FIG. 1, there is no input signal to the valve and pressurized fluid is supplied to the nozzle 20 by the flapper 16 in a manner such as to produce a pressure in variable chamber 18 which is coupled to the left end of the spool piston 30, adjacent the land 32. This pressure is exactly equal to the pressure coupled to the right end of the spool piston, adjacent to land 36, by means of the pressure in the compensation chamber 66, so as to maintain spool piston 30 in the null position shown in FIG. 1.

The center land 34 controls the opening of the control chambers 38 and 40 with respect to the input pressure conduit 26. The land 32 controls the opening of the chamber 38 with respect to system return via conduit 80; similarly, land 36 controls the opening of the chamber 40 with respect to system return via conduit 82.

The application of a positive input signal to the input pin 42 causes the same to move to the right, as viewed in FIG. 1 and as indicated by the arrow 47. Movement of the pin 42 causes compression of the spring 44 which in turn causes the piston element 46 to urge the bellows 50 against the pilot valve flapper member 16. The flapper member 16 then moves toward the nozzle 20 and increases the occlusion thereof causing a reduction in the pressure in chamber 18. Reduction of the pressure in chamber 18, reduces the force applied to the land 32 and thus upon the left end of the piston 30 and upsets the pressure balance on the piston whereupon movement of the piston to the left commences.

Movement of the piston to the left causes land 34 to open control chamber 40 to pressure conduit 26 and causes land 32 to open control chamber 38 to return conduit 80. Thus, control ports C1 and C2 are coupled to chambers 38 and 40 in a manner whereby pressurized fluid flows through conduit 64 to the load 60 and from the load 60 through conduit 62 to return conduit 80 and system return 58, thereby causing the load 60 to also move to the left, as viewed in FIG. 1.

The increased pressure in conduit 64 is coupled through conduit 78 and fixed restrictor 74 to variable pressure chamber 18 to increase the pressure therein. Concomitantly with the increase of pressure in chamber 18, he decreased pressure in conduit 62 is fed back through restrictor 72 and conduit 76 to compensation chamber 66.

The feedback of the increased pressure to chamber 18 and the decreased pressure to chamber 66 results in a rebalancing of the pressures exerted on the ends of the piston spool 30 whereupon further motion of the piston is ceased. At this point the load has moved a predetermined distance which is related to the force output, i.e., the area of the piston on which the pressure is acting times the pressure and the pressure across the load 60 is at a predetermined value which is related to the pin displacement.

Figure 2:
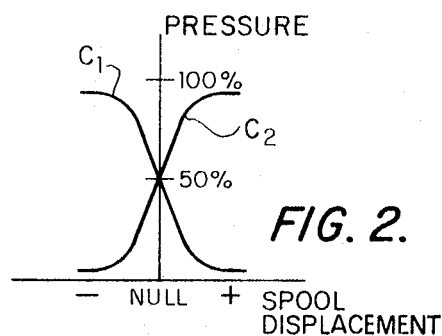
FIG. 2 is a graph illustrating control pressure output as a function of spool displacement of the second stage.

With reference to FIG. 2, it will be seen that for a positive force to the pin 42 there is a positive displacement of the piston spool 30 in that the pressure in control port $C_2$ increases while that in control port $C_1$ decreases, whereupon the pressure differential between the two is the pressure output existing across the load 60.

Figure 3:
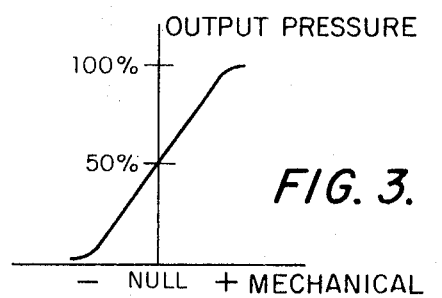
FIG. 3 is a graph illustrating the differential pressure output as a function of mechanical input displacement.

The pressure output across the load as a function of mechanical input displacement, i.e., displacement of the pin 42 from its null or reference position, is shown in FIG. 3, from which it can be seen that the output pressure versus mechanical input position is a linear function throughout substantially the entire pressure range of the system. However, there is some nonlinearity in the system in the vicinity of the 0 percent and 100 percent pressure areas since the flapper member 16 and nozzle 20 exhibit some slight nonlinearity and since the flapper 16 is unable to completely close the nozzle 20 whereby there is some small resultant leakage in the system.

It is herein to be noted that the use of the torsionally mounted, cantilevered pilot valve flapper member 16 results in a system wherein a relatively large displacement of the input pin 42 results in a relatively small displacement of the flapper 16 so as to provide excellent pressure control of the load 60.

Referring again to FIG. 1, it will be seen that if the input pin is moved to the left, in a negative direction, the flapper 16 will move away from the nozzle 20 to lessen the occlusion thereof and result in a pressure increase in variable pressure chamber 18. The pressure increase in chamber 18 causes an increase in the force applied to the land 32 and thus upon the left end of the piston 30 and upsets the pressure balance on the piston whereupon movement of the piston to the right is commenced.

Movement of the piston to the right causes land 34 to open control chamber 38 to pressure conduit 26 and causes land 36 to open control chamber 40 to return conduit 82, whereby control ports $C_1$ and $C_2$ are coupled to chambers 38 and 40 in a manner such that pressurized fluid flows through conduit 62 to the load 60, and from the load 60 through conduit 64 to return conduit 82 and thereby system return 58. This causes the load 60 to also move to the right as viewed in FIG. 1. The increased pressure in conduit 62 is coupled through conduit 76 and fixed restrictor 72 to the compensation chamber 66 to cause an increase in the pressure in the chamber. Concomitantly, with the increase of pressure in chamber 66, the decreased pressure in conduit 64 is fed back through restrictor 74 and conduit 78 to the variable pressure chamber 18.

The feedback of the increased pressure to chamber 66 and decreased pressure to chamber 18 results in rebalancing of the pressures exerted upon the ends of the piston spool 30. Whereupon further motion of the piston is ceased. Once more, the load has moved a predetermined distance, linearly related to the displacement of the input pin 42 and the pressure across the load 60 is at a predetermined value which is also linearly related to the pin displacement.

It is herein to be noted that although the conduits 76 and 78 have been shown disposed externally of the piston cylinder 28, they may also be connected internally thereof. This may be accomplished by having the conduits pass through the piston spool lands 32, 34 and 36, in a manner whereby conduit 76 is disposed in pressure communication with chamber 66 and conduit 78 is disposed in pressure communication with chamber 18, while still maintaining chambers 18, 38, 40 and 66 isolated from one another.

Figure 4:
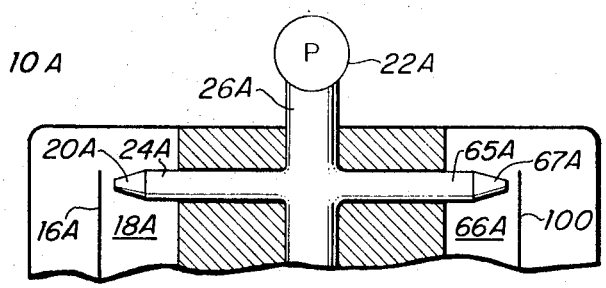
FIG. 4 is a sectional view of two stage hydraulic servo valves, similar to FIG. 1, constructed in accordance with another embodiment of the present invention and wherein the valve includes means for compensating for variations in system pressure.

Another embodiment of the invention is depicted in FIG. 4 wherein similar parts are denoted by similar referenced numerals. In the valve of FIG. 4, a torsionally mounted, cantilever flapper member 100 is positioned within the compensation pressure chamber 66A. The flapper member 100 is disposed adjacent the nozzle 67A and transforms the fixed restriction nozzle 67 of FIG. 1, into a variable orifice whereby the pressure in chamber 66A is dependent upon the occlusion of the nozzle 67A by the flapper member 100.

The provision of a flapper in each of the chambers 18A and 66A provides a valve wherein there is automatic compensation for variations in system pressure, or stated alternatively, there is provided automatic pressure regulation for variations in system pressure. Therefore any change in system pressure will result in variation of the occlusion of the nozzle 20A by the flapper 16A and of the nozzle 67A by the flapper 100 which will compensate for any change in any change in system pressure.

Figure 5:
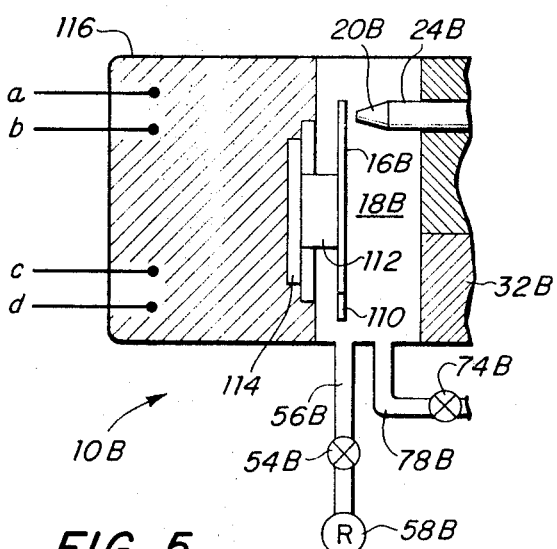
FIG. 5 is a partial sectional view of another embodiment of the present invention similar to that embodiment depicted by FIG 1.

As discussed previously, the valve 10 can be actuated by either a mechanical valve 10 can be actuated by either a mechanical input signal thereto, as discussed in detail hereinbefore, or can be actuated by an electrical input signal thereto. An embodiment of the invention showing the valve constructed in accordance with the basic principles of the present invention and having an electrical input actuation is depicted in FIG. 5, wherein similar parts are denoted by similar reference.

Referring now to the drawing, there is shown a valve 10B having a first stage which includes a flapper member 16B disposed in a variable pressure chamber 18B and formed integrally with a torsion bar 110. The flapper member is connected by means of a coupling member 112 to the armature 114 of a motor designated generally by the reference numeral 116. The motor 116 is preferably of the electromagnetic type and the entire arrangement described therein is shown and discussed in detail in my previous U.S. Pat. No. 3,302,147 issued Jan. 31, 1967.

The position of the flapper member 16B is controlled by means of the electrical inputs supplied to the motor at terminals $a$, $b$, $c$ and $d$, respectively, and the operation thereof is discussed in detail in my previously mentioned U.S. Patent.

The operation of the valve 10B is dependent upon the position of the flapper member 16B with respect to the nozzle 20B and is the same as that discussed previously in conjunction with FIG. 1.

It is thus seen that I have provided a new and novel pressure regulated hydraulic servo valve for controlling the positional displacement of a hydraulic load and pressure load thereacross in dependence upon a mechanical input signal.

While I have shown and described preferred embodiments of my invention, it will be apparent to those skilled in the art that many modifications, changes and improvements may be made therein without departing from the spirit and scope of the invention as defined in the appended claims.

I claim:
1. A fluid control apparatus, comprising:
   a housing;
   a variable pressure chamber formed in said housing and disposed in communicating relationship with a pressurized source of fluid;
   a pilot valve disposed within said chamber for varying the pressure therewithin in accordance with a predetermined signal;
   a compensation pressure chamber formed in said housing;
   a piston cylinder formed in said housing and extending from said variable pressure chamber to said compensation chamber;
   a pair of control ports in said cylinder, a spool piston disposed within said cylinder and operable in response to pressure changes in said variable pressure chamber to selectively connect one of said control ports to system pressure and the other of said control ports to system return for controlling the application of pressurized fluid to said compensation chamber for causing the pressure therein to vary in a predetermined manner with respect to the pressure in said variable pressure chamber;
   means for coupling a first of said control ports to said variable pressure chamber;
   means for coupling the second of said control ports to said compensation pressure chamber;
   said coupling means providing pressure feedback to said compensation and variable pressure chambers to cease movement of said piston after said piston has moved a predetermined distance in dependence 1 upon said predetermined signal; and
   output means including said control ports for coupling pressurized fluid indicative of said compensation pressure to an output actuating device.

2. A fluid control apparatus as defined in claim 1 wherein said pilot valve comprises:
   a nozzle communicating directly with a pressurized source of fluid;
   a cantilever flapper torsionally mounted to said housing; and
   an input actuation device responsive to said predetermined signal for displacing said flapper to variably occlude said nozzle and vary the fluid pressure in said variable pressure chamber.

3. A fluid control apparatus as defined in claim 2 wherein said input actuation device is electrical and comprises an electromagnetic motor and means for coupling the armature of said motor ro said flapper.

4. A fluid control apparatus as defined in claim 2 wherein said input actuation device is mechanical and comprises a mechanical displacement transformer means coupled to said flapper and a displaceable pilot signal element coupled to said transformer means to enable a relatively large displacement of said pilot element to produce a relatively small displacement of said flapper.

5. A fluid control apparatus as defined in claim 2 wherein said input actuation device, said flapper, said variable pressure chamber, said spool piston and said compensation pressure chamber are all disposed in linear alignment.

6. A fluid control apparatus as defined in claim 1 wherein:
   at least one of said coupling means includes a fixed restrictor connected between one of said control ports and one of said pressure chambers.